(12) United States Patent
Aoki (10) Patent No.: US 8,059,867 B2
(45) Date of Patent: Nov. 15, 2011

(54) DETECTION SYSTEM, INFORMING SYSTEM, ACTUATION SYSTEM AND VEHICLE

(75) Inventor: Hiroshi Aoki, Minato-ku (JP)

(73) Assignee: Takata Corporation, Tokyo (JP)

( * ) Notice: Subject to any disclaimer, the term of this patent is extended or adjusted under 35 U.S.C. 154(b) by 1127 days.

(21) Appl. No.: 11/355,449

(22) Filed: Feb. 16, 2006

(65) Prior Publication Data

US 2006/0186651 A1  Aug. 24, 2006

(30) Foreign Application Priority Data

Feb. 18, 2005  (JP) ................................. 2005-042458

(51) Int. Cl.
*G06K 9/00* (2006.01)
(52) U.S. Cl. .................... 382/104; 382/103; 382/154
(58) Field of Classification Search .............. 382/103, 382/104, 154
See application file for complete search history.

(56) References Cited

U.S. PATENT DOCUMENTS

| | | | | |
|---|---|---|---|---|
| 3,349,679 A * | 10/1967 | Lohman, III | ................. | 396/427 |
| 3,505,465 A * | 4/1970 | Rees | ................. | 348/36 |
| 5,528,698 A * | 6/1996 | Kamei et al. | ................. | 382/100 |
| 5,835,613 A * | 11/1998 | Breed et al. | ................. | 382/100 |
| 5,954,360 A * | 9/1999 | Griggs et al. | ................. | 280/735 |
| 5,983,147 A * | 11/1999 | Krumm | ................. | 701/45 |
| 6,113,137 A * | 9/2000 | Mizutani et al. | ................. | 280/735 |
| 6,393,133 B1 * | 5/2002 | Breed et al. | ................. | 382/100 |
| 6,480,616 B1 * | 11/2002 | Hata et al. | ................. | 382/106 |
| 6,822,673 B1 * | 11/2004 | Kelly | ................. | 348/61 |
| 6,848,710 B2 * | 2/2005 | Yasuhara et al. | ............ | 280/730.2 |
| 6,856,873 B2 * | 2/2005 | Breed et al. | ................. | 701/45 |
| 6,857,656 B2 * | 2/2005 | Yasui | ................. | 280/735 |
| 6,914,526 B2 * | 7/2005 | Wallace et al. | ................. | 340/541 |
| 6,921,106 B2 * | 7/2005 | Yasui | ................. | 280/735 |
| 6,947,071 B2 * | 9/2005 | Eichmann | ................. | 348/142 |
| 7,245,741 B1 * | 7/2007 | Ertl et al. | ................. | 382/103 |
| 7,379,559 B2 * | 5/2008 | Wallace et al. | ................. | 382/100 |
| 7,406,181 B2 * | 7/2008 | O'Boyle et al. | ................. | 382/104 |
| 7,446,668 B2 * | 11/2008 | Young et al. | ................. | 340/667 |
| 2002/0085739 A1 * | 7/2002 | Ertl et al. | ................. | 382/104 |
| 2003/0179083 A1 * | 9/2003 | Wallace et al. | ............ | 340/426.1 |
| 2004/0153229 A1 * | 8/2004 | Gokturk et al. | ................. | 701/45 |
| 2005/0111700 A1 * | 5/2005 | O'Boyle et al. | ................. | 382/104 |

(Continued)

FOREIGN PATENT DOCUMENTS

DE  103 26 840 A1  12/2004

(Continued)

OTHER PUBLICATIONS

A search report dated May 15, 2007, from the European Patent Office in corresponding European Application No. 06002048.4-1523.

*Primary Examiner* — Samir Ahmed
*Assistant Examiner* — Jayesh A Patel
(74) *Attorney, Agent, or Firm* — Fitch Even Tabin & Flannery (57) ABSTRACT

A detection system is provided for easily detecting information about respective objects seated on a plurality of vehicle seats. An occupant information detection apparatus for a vehicle is disclosed which, in one form, comprises a single photographing section capable of detecting image, a projector lens and a mirror which have viewing angles wider than that of the single photographing section and can independently project the objects seated to the single photographing section to correspond to respective vehicle seats, and a control section for detecting information about objects seated on the respective vehicle seats.

10 Claims, 7 Drawing Sheets

U.S. PATENT DOCUMENTS

2005/0201591 A1 * 9/2005 Kiselewich .................. 382/104

FOREIGN PATENT DOCUMENTS

| | | | |
|---|---|---|---|
| EP | 1 298 013 A2 | | 4/2003 |
| GB | 2224358 A | * | 5/1990 |
| GB | 2 301 922 A | | 12/1996 |
| GB | 2 311 602 A | | 10/1997 |
| GB | 2311602 A | * | 10/1997 |
| JP | 2003 294855 | | 10/2003 |
| JP | 2005 075261 | | 3/2005 |

* cited by examiner

DETECTION SYSTEM, INFORMING SYSTEM, ACTUATION SYSTEM AND VEHICLE

FIELD OF THE INVENTION

The present invention relates to a detection system to be installed in a vehicle and, more particularly, the invention relates to a technology for developing a detection system for detecting information about respective objects seated on a plurality of vehicle seats.

BACKGROUND OF THE INVENTION

Conventionally, various technologies for detecting information about an object seated on a vehicle seat by using a photographing device such as a camera are known. For example, disclosed in Japanese Patent Unexamined Publication No. 2003-294855 is a configuration of an occupant detecting apparatus in which a single camera arranged in front of a vehicle occupant is used to detect the position of the vehicle occupant.

With the technology for detecting information about a vehicle occupant by using a single camera such as the occupant detecting apparatus disclosed in Japanese Patent Unexamined Publication No. 2003-294855, however, it is difficult to address the request for detecting about a plurality of vehicle occupants because the camera has a limitation on its viewing angle. To address the request, the technique using a wide-angle lens or a fish-eye lens has been proposed as a technology for detecting information about a plurality of vehicle occupants. With this technique, however, it is required to compensate distortion in image due to the wide angle. Accordingly, there is a problem of increasing the complexity and size of the apparatus.

SUMMARY OF THE INVENTION

The present invention has been made in view of the above problems and it is an object of the present invention to provide an effective technology for easily detecting information about respective objects seated on a plurality of vehicle seats.

For achieving the object, the present invention is configured. Though the present invention is typically adopted to a detection system for detecting information about respective objects seated on vehicle seats in an automobile, the present invention can be also adopted to a technology for a detection system for detecting information about respective objects seated on vehicle seats of a vehicle other than the automobile.

The first form of the present invention for achieving the aforementioned object is a detection system as described hereafter.

The detection system in this form is a detection system for detecting information about objects seated on a plurality of vehicle seats and comprises at least a single photographing device, a projector device or mechanism, and a detection device. The "objects seated" used here may be a vehicle occupant seated directly or indirectly on a vehicle seat and may widely include any object (for example, a child seat) put on the vehicle seat. The "information about object seated" may include the configuration (volume and body size) of the object seated, the position of the object seated, the posture of the object seated, the occupation status of the object seated, and the kind of the object seated. The "vehicle seat" used here means a seating region defined corresponding to the object seated. It is no object that the number of the vehicle seats here does not corresponds to the number of seats as actual structures. For example, one seat on which two vehicle occupants can be seated at the same time is considered as two vehicle seats in the present invention.

The single photographing device of the present invention is a device having a function capable of detecting image and typically is a single camera installed to a vehicle cabin. Required by the present invention is that the photographing device for detecting information about objects seated has a unified structure. That is, the present invention does not limit the employment of any photographing device such as a camera for another purpose other than the aforementioned photographing device.

The projector device of the present invention is a device having a viewing angle wider than that of said single photographing device and having a function capable of independently projecting the objects on the seats to the single photographing device to correspond to the respective vehicle seat. By the projector device having the aforementioned structure, the object projected to the single photographing device can be detected directly by the single photographing device. The projector device can project a plurality of objects on the seats to the single photographing device independently to correspond to the respective vehicle seats so that it should be understood that the projector device can project a single object.

The detection device of the present invention is a device having a function of detecting (extracting) information about objects seated on the vehicle seats from the image detected by said single photographing device. By the process of the detection device having the aforementioned structure, desired information about objects on seats can be derived. The process by the detection device is achieved by known image processing and computing processing. The derived information about objects on seats is used for control of an occupant protection device such as an airbag and a seat belt and control of various target devices in the vehicle.

According to the detection system having the aforementioned structure, the single photographing device is used and the projector device capable of independently projecting the objects on the seats to the single photographing device to correspond to the respective vehicle seat, thereby easily detecting information about objects seated on a plurality of vehicle seats. This structure does not require warping correction that is required if using a wide-angle lens or a fish-eye lens, thereby solving the problem of complexity and large size of the apparatus using such a lens.

The detection system of the present invention enables easy detection of information about objects seated on a plurality of vehicle seats and also enables easy detection of information about an object seated on a single vehicle seat.

The second form of the present invention for achieving the aforementioned object is a detection system as described hereafter.

In the detection system in this form, the projector device as described above includes a mirror or a prism. Specifically, the mirror may be composed of a plane mirror, a concave mirror, and/or a convex mirror or may be composed of a combination of a plurality of such mirrors. As an example, the mirror is composed of a plane mirror facing a driver seat and a plane mirror facing a front passenger seat. Alternatively, a prism as an optical member having functions of deflecting, reflecting, and diffusing incident light may be employed. This structure can simplify the structure of the projector device.

According to the present invention, the mirror or prism having the field of view corresponding to the previously estimated specified field of view may be fixed to the vehicle body. In addition, the mirror or prism having a field of view narrower than the previously estimated specified field of view may be adapted to be movable relative to the vehicle body so as to ensure the specified field of view.

The third form of the present invention for achieving the aforementioned object is a detection system as described hereafter.

In the detection system in this form, the detection device as described in any of the earlier described forms detects a distance between said single photographing device and each object on a seat from the image detected by the single photographing device and estimates a three-dimensional configuration of the object on the seat based on the detected distance. This structure enables the detection of desired information about the object on the seat from the three-dimensional configuration of the object on the seat.

The fourth form of the present invention for achieving the aforementioned object is a detection system as described hereafter.

In the detection system in this form, the detection device as described in the third form digitizes the three-dimensional configuration of each object on a seat into space coordinates (3D coordinates) based on the detected distance between the single photographing device and the object. The coordinate system for the space coordinates may be a polar coordinate system from the single photographing device or an orthogonal coordinate system of which Z-axis is an optical axis of the single photographing device. Alternatively, in order to simplify the subsequent calculation, the digitization may be conducted to a coordinate system composed of coordinates in the anteroposterior direction, the vertical direction, and the lateral direction of the vehicle. This structure enables the high-precision estimation of the three-dimensional configuration of the object on the seat, thereby enabling the higher precision of detection of desired information about the object on the seat.

The fifth form of the present invention for achieving the aforementioned object is a detection system as described hereafter.

In the detection system in this form, the detection device as described in the third or fourth forms detects information about the position of a vehicle occupant by detecting the position of a portion having a profile corresponding to a particular portion of the vehicle occupant as the object on the seat from the estimated three-dimensional configuration. As the term "particular portion" used here, a part which is effective in figuring out features of human body is set. Concretely, a portion of the face or the under jaw, or one of the shoulders may be set as the particular portion. By identifying the particular portion, it is possible to detect the position of the feature part of the body such as the neck or the shoulder. According to this structure, it is possible to easily detect information about the position of the vehicle occupant from the three-dimensional profile of the object on the seat.

The sixth form of the present invention for achieving the aforementioned object is a detection system as described hereafter.

In the detection system in this form, the detection device as described in the third or fourth forms detects information about the size and posture of a vehicle occupant by detecting the position of a portion having a profile corresponding to a particular portion of the vehicle occupant as the object on the seat from the estimated three-dimensional configuration and deriving information about the volume of the three-dimensional configuration. According to this structure, it is possible to easily detect information about the size and posture of the vehicle occupant from the three-dimensional profile of the object on the seat.

The seventh form of the present invention for achieving the aforementioned object is a detection system as described hereafter.

The detection system in this form having the structure as described in any of the earlier described forms is adapted to be located at a position capable of detecting information at least about objects seated on a driver seat and a front passenger seat among the respective components of the vehicle. The location of the detection system may be suitably selected from a group consisting of an interior ceiling, a root of an A-pillar, a middle portion between the A-pillar and a B-pillar, an interior side of a door mirror, an upper portion of a rear view mirror, and a center portion in the lateral direction of a dashboard. The structure enables detection of the information of the objects on the seats in a wide range including the driver seat and the front passenger seat.

The eighth form of the present invention for achieving the aforementioned object is a detection system as described hereafter.

The detection system in this form having the structure as described in the seventh form is adapted to be located at a position also capable of detecting information about objects seated on a rear seat. For ensuring such a field of view for viewing all of the driver seat, the front passenger seat, and the rear seat, it is preferable to select a central portion in the lateral direction of the interior ceiling as the location of the detection system. This structure enables the detection of the information about the objects on the seats in a wide range including the objects seated on the driver seat, the front passenger seat, and the rear seat.

The ninth form of the present invention for achieving the aforementioned object is a detection system as described hereafter.

In the detection system in this form, the detection device described in any one of the earlier described forms conducts a detecting process only for predetermined areas, to which the objects seated on the vehicle seats are projected, respectively, of the region to be projected in the single photographing device. That is, when the areas indicating seated objects as targets are specified in the entire region to be projected, the detection process is conducted only for the specified areas. According to this structure, the region to be detected by the detection device is limited from the projected region in the single photographing device so as to remove excess detection process for other region, thereby achieving the reduction in processing amount (calculating amount) relating to the detection and thus enabling high-speed process. Because of the reduction in processing amount (calculating amount), the processing load is reduced, thereby effectively reducing the cost on the system.

The tenth form of the present invention for achieving the aforementioned object is a detection system as described hereafter.

In the detection system in this form, the detection device as described in any one of the earlier described forms determines whether an object seated on a vehicle seat is a vehicle occupant or a child seat based on the detected information about the object on the seat. For example, the determination is made by estimating the three-dimensional configuration of the object on the seat and discriminating whether the object on the seat is a vehicle occupant or a child seat from features of the three-dimensional configuration. This structure is effective for controlling such a target device that requires different forms of control between the case of a vehicle occupant and the case of a child seat. A typical example of such target devices is an airbag. As for the control of the airbag, when the object on the seat is a vehicle occupant, the airbag is controlled to be deployed into an area for protecting the vehicle occupant. When the object on the seat is a child seat, the airbag is controlled not to be deployed.

The eleventh form of the present invention for achieving the aforementioned object is a detection system as described hereafter.

The detection system in this form having the structure as described in any one of the earlier described forms further comprises an illumination device (lighting device). Based on the distance and the angle of field between the single photographing device and an object seated on a vehicle seat, the illumination device varies its illumination form for the object on the seat. The "illumination form" used here widely include the strength, the angle, emission interval, and the wavelength of illumination (lighting). The structure for allowing "variable illumination form" may be a structure in which the illumination forms are previously set to correspond to the respective objects on the seat or a structure in which the illumination form is varied every time the distance or the angle of field between the single photographing device and the object seated on the vehicle seat is detected. According to the structure, the illumination form of the illumination device can be properly set for each object on the seat, thereby improving the efficiency of illumination.

In the present invention, it is preferable that the illumination device has a driving circuit for each object on the seat so that the illumination form can be independently set to correspond to the object seated. According to the structure, the illumination form by the illumination device is reasonably controlled. Also in this invention, it is preferable that the illumination device is adapted to emit light of near-infrared wavelength. Such light is invisible to the eyes of vehicle occupants. Therefore, the illumination device hardly affects the field of view of the vehicle occupants.

The twelfth form of the present invention for achieving the aforementioned object is an informing system as described hereafter.

The informing system in this form comprises: a detection system as described in any one of the earlier described forms, and an informing device for informing a vehicle occupant of the information about objects on seats detected by the detection device. The "informing" used here may be conducted in a form of which examples include various output forms such as sound (announcement, buzzer, or the like), indication (color, character, mark, numeric, or the like), and vibration. According to this structure, by informing of the information about the object on the seats, the information about the object on the seats can be quickly transmitted to the vehicle occupant(s).

The thirteenth form of the present invention for achieving the aforementioned object is an informing system as described hereafter.

In the informing system in this form, as for a vehicle occupant as the object on the seat, the detection device as described in the twelfth form detects the size and posture of the vehicle occupant as the information about the objects seated and, based on the size and posture, determines whether or not the vehicle occupant is in a proper state that the occupant will be properly protected by an occupant protection device such as an airbag in the event of vehicle collision. When the detection device determines that the vehicle occupant is not in the proper state, the informing device informs the vehicle occupant of the determination by the detection device. According to this structure, by informing the vehicle occupant that the vehicle occupant is not in the proper state, the vehicle occupant is quickly prompted to correct his or her posture.

The fourteenth form of the present invention for achieving the aforementioned object is an informing system as described hereafter.

In the informing system in this form, as for a vehicle occupant as the object on the seat, the detection device as described in the twelfth form, detects whether or not the vehicle occupant is seated as the information of the object on the seat. When the detection device detects the information indicating that the vehicle occupant is seated, the informing device informs the vehicle occupant of the information detected by the detection device. According to the structure, by informing the vehicle occupant of the information indicating that the vehicle occupant is seated, the vehicle occupant is quickly prompted to wear a seat belt for restraining the vehicle occupant.

The fifteenth form of the present invention for achieving the aforementioned object is an actuation system as described hereafter.

The actuation system in this form comprises at least a detection system as described in any one of the earlier described forms and an actuation control device. The actuation control device is a device having a function for controlling the actuation of various target devices in a vehicle and/or the actuation of an occupant protection device for protecting a vehicle occupant, based on the information about the vehicle occupant as the information about an object on a seat detected by the detection device. According to this structure, an actuation system is provided in which information about respective objects seated on vehicle seats can be detected easily by the detection system and the detection results are used to control the actuation of respective target devices and the occupant protection device.

The sixteenth form of the present invention for achieving the aforementioned object is an actuation system as described hereafter.

In the actuation system in this form, the occupant protection device as described in the fifteenth form comprises an airbag to be deployed into a range for occupant protection in the event of vehicle collision and an inflator for supplying gas for inflation into the airbag. In addition, the actuation control device controls the gas supplying form of the inflator relative to the airbag, based on the information about the body size of the vehicle occupant. Therefore, the pressure and the amount of gas to be supplied to the airbag from the inflator in the event of vehicle collision are controlled to be varied to correspond to the body size of the vehicle occupant. Specifically, the pressure and the amount of gas to be supplied to the airbag from the inflator is controlled to be small when it is detected that a child having a small body size is seated, compared to when it is detected that an adult having a large body size is seated. According to this structure, the deployment form of the airbag in the event of vehicle collision can be reasonably controlled using information about the vehicle occupant which is easily and precisely detected by the detection system, thereby ensuring the protection of the vehicle occupant in the event of vehicle collision.

The seventeenth form of the present invention for achieving the aforementioned object is a vehicle as described hereafter.

The vehicle in this form is a vehicle with an actuation system as described in the fifteenth or sixteenth forms. According to this structure, a vehicle is provided in which information about respective objects seated on vehicle seats can be detected easily by the detection system and the detection results are used to control the actuation of respective target devices and the occupant protection device.

The eighteenth form of the present invention for achieving the aforementioned object is a vehicle as described hereafter.

The vehicle in this form is a vehicle comprising at least: an engine/running system, an electrical system, an actuation control device, a vehicle seat, a camera, and a processing device.

The engine/running system is a system involving an engine and a running mechanism of the vehicle. The electrical system is a system involving electrical parts used in the vehicle. The actuation control device is a device having a function for conducting the actuation control of the engine/running system and the electrical system. The camera is a single camera capable of setting the view point onto the vehicle seats. The processing device is a device having a function of processing the information from the single camera by the actuation control device. The processing device is provided with a detection system as described in any one of the first form through the eleventh form. The information about the objects on the seats detected by the detection system is suitably processed by the processing device and is used for controlling various target devices relating to the vehicle such as an occupant protection device for protecting a vehicle occupant.

According to this structure, a vehicle is provided in which information about respective objects seated on vehicle seats can be detected easily by the detection system and the detection results are used to control the actuation of respective target devices and the occupant protection device.

As described in the above, the present invention provides an effective technology for easily detecting information about respective objects seated on a plurality of vehicle seats by a structure using a single photographing device and using a projector device capable of independently projecting the objects seated to correspond to the respective vehicle seats.

DETAILED DESCRIPTION OF THE PREFERRED EMBODIMENTS

Hereinafter, embodiments of the present invention will be described in detail with reference to drawings. First, description will be made as regard to an occupant information detection apparatus 100 as an embodiment of the "detection system" according to the present invention with reference to FIG. 1 and FIG. 3.

Figure 1:
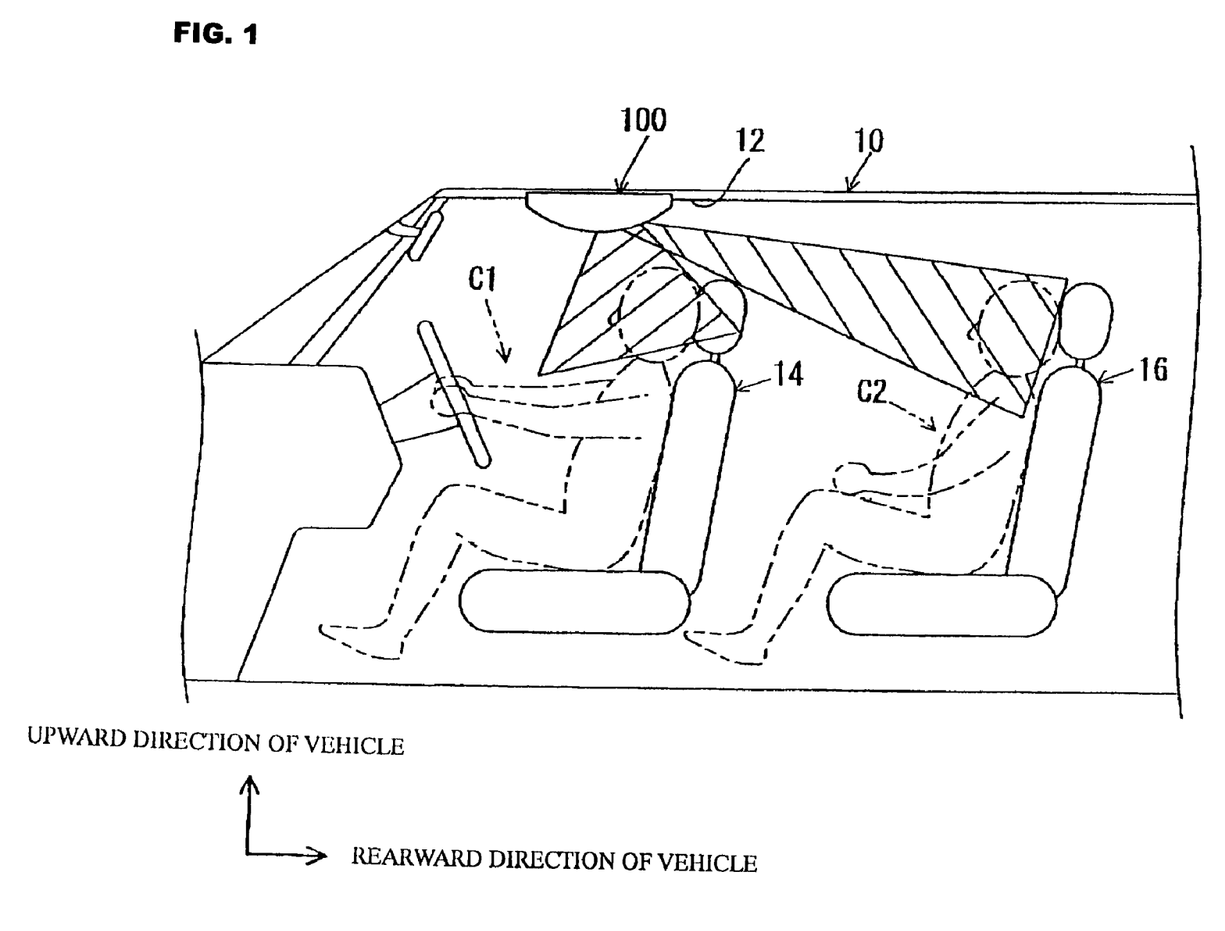
FIG. 1 is an illustration showing the structure of an occupant information detection apparatus 100, which is installed in a vehicle, according to an embodiment.

The structure of the occupant information detection apparatus 100, which is installed in a vehicle, of this embodiment is shown in FIG. 1.

As shown in FIG. 1, the occupant information detection apparatus 100 of this embodiment serves as an apparatus for detecting information about respective vehicle occupants (corresponding to the "information about objects seated" of the present invention) on a plurality of vehicle seats in an automobile 10 which corresponds to the "vehicle" of the present invention. Specifically, the occupant information detection apparatus 100 is an apparatus for detecting information such as the sizes, the configurations, and the positions of front seat occupants C1 on front seats 14 and a rear seat occupant(s) C2 on a rear seat 16, the occupation status, and the kinds of objects seated by photographing the front seats (a driver seat and a front passenger seat) 14 and the rear seat 16. In the example illustrated in FIG. 1, the occupant information detection apparatus 100 is disposed to a center in the lateral direction of an interior ceiling 12 of the vehicle. At this location, the camera has a wide viewing angle capable of scanning a driver seat, a front passenger seat, and entire rear seat.

The vehicle 10 comprises, but not shown, an engine/running system involving an engine and a running mechanism of the vehicle, an electrical system involving electrical parts used in the vehicle, an actuation control device for conducting the actuation control of the engine/running system and the electrical system, a processing device (control section 120 as will be described later) for processing the information from a camera 112 (as will be described later) by the actuation control device, and the like.

Figure 2:
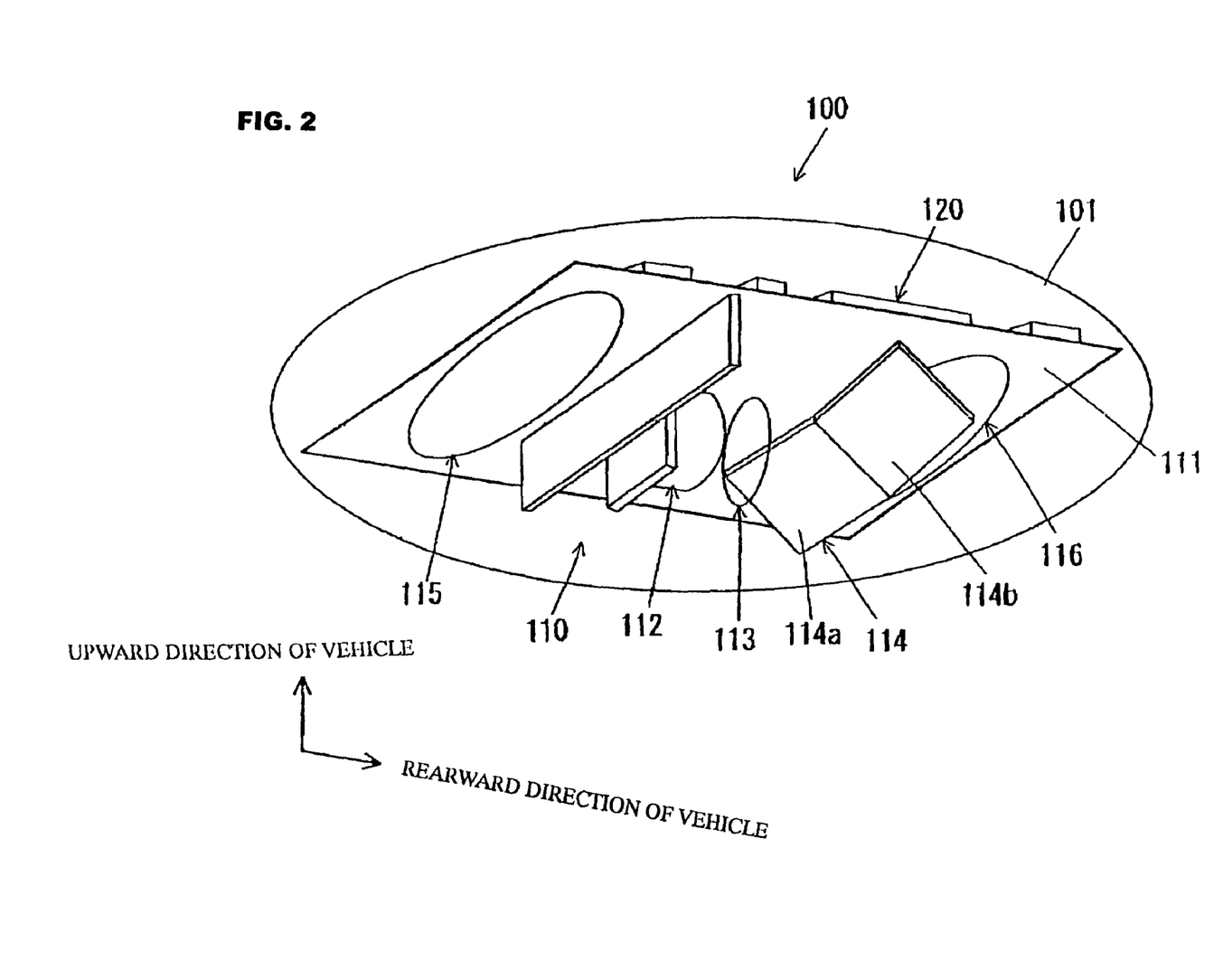
FIG. 2 is a perspective view showing the occupant information detection apparatus 100 of the embodiment, taken from a lower portion of a vehicle cabin.

The occupant information detection apparatus 100 is schematically shown in FIG. 2 as a perspective view taken from a lower portion of the vehicle cabin.

As shown in FIG. 2, the occupant information detection apparatus 100 mainly comprises a photographing section 110 and a control section 120 which are accommodated inside a transparent cover 101 covering them from the cabin side. The photographing section 110 is disposed on a lower side of a base 111 and the control section 120 is disposed on an upper side of the base 111.

The photographing section 110 has a function of photographing vehicle occupants and comprises at least the camera 112, a projector lens 113, a mirror 114, a front illuminator 115, and a rear illuminator 116.

The camera 112 is a stereo (three-dimensional) camera of a C-MOS or CCD (charge-coupled device) type in which light sensors are arranged into an array (lattice) arrangement. The camera 112 (the photographing section 110) serves as a photographing device which can measure the distance from the camera to an object by measuring a time from emission of light from the illuminators 115 and 116 to reception of the light reflecting on the object, thereby detecting a range image (3D) with the measured distance. The camera 112 (the photographing section 110) corresponds to the "single photographing device" of the present invention.

The projector lens 113 and the mirror 114 have a function as projector device or mechanism for projecting an object seated on a vehicle seat to the camera 112. As will be described later in detail, the projector lens 113 and the mirror 114 have viewing angles wider than that of the camera 112 and can independently project the objects on the seats to the camera 112 to correspond to respective vehicle seats. Therefore, for example, the vehicle occupant on the driver seat and the vehicle occupant on the front passenger seat can be independently projected to the camera 112. The projector lens 113 and the mirror 114 correspond to the "projector device" of the present invention.

The front illuminator 115 is configured as an illumination device (lighting device) for illuminating an object on a seat (for example, the front seat occupant C1) as an object to be detected (object to be illuminated). Similarly, the rear illuminator 116 is configured as a lighting device for illuminating another object on a seat (for example, the rear seat occupant C2) as an object to be detected (object to be illuminated). As will be described later, the front illuminator 115 and the rear illuminator 116 can vary the illumination form to the object (vehicle occupant) on the seat according to the distance and the angle of field between the camera 112 and the object (vehicle occupant) and correspond to the "illumination device" of the present invention.

The control section 120 has a function of detecting (extracting) information about each object seated on each of the vehicle seats from the image photographed by the camera 112 of the photographing section 110. The control section 120 corresponds to the "detection device" of the present invention. The system configuration of the control section 120 of this embodiment is shown in FIG. 3.

Figure 3:
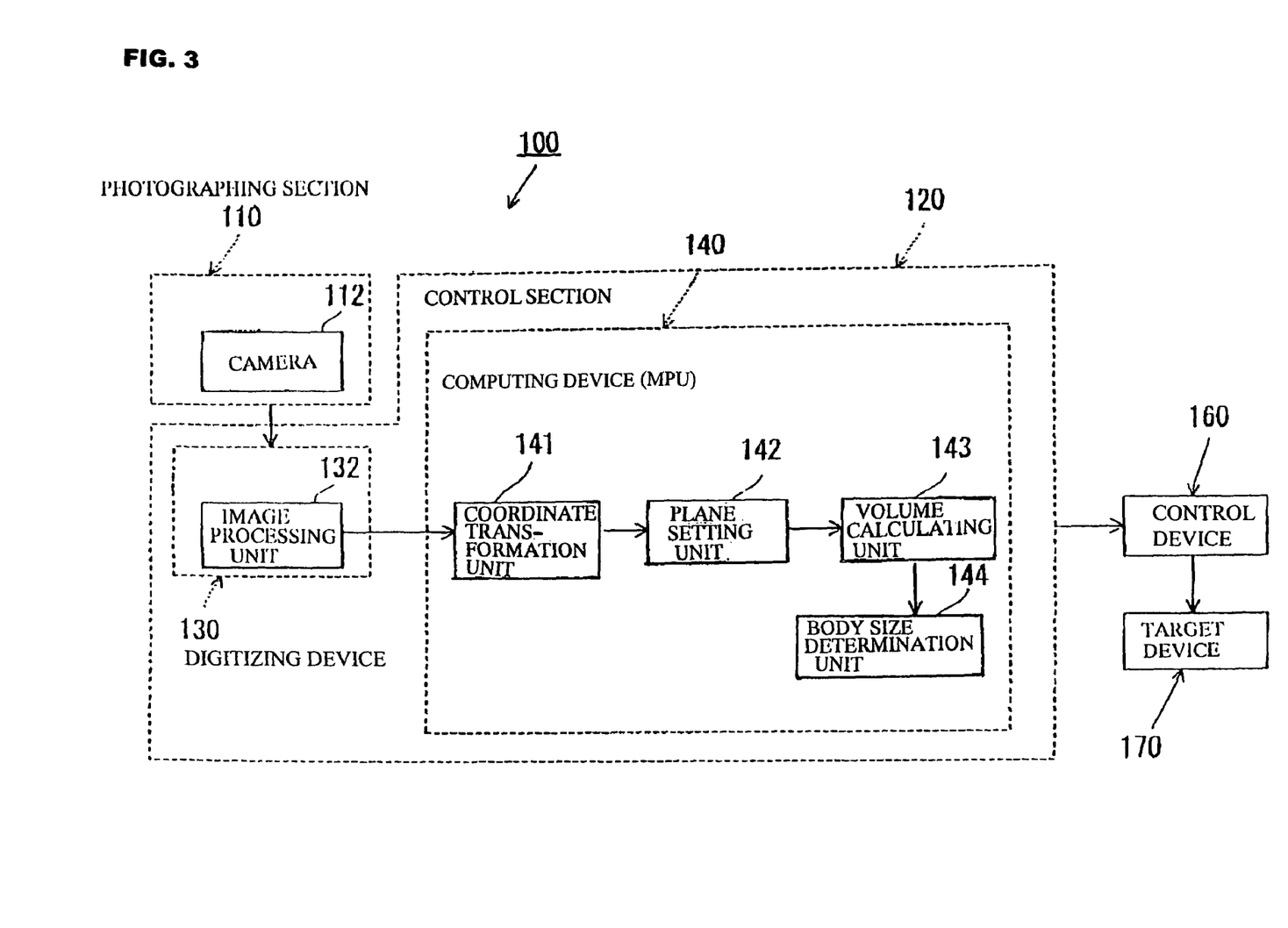
FIG. 3 is a diagram showing of the system configuration of a control section 120 of the embodiment.

As shown in FIG. 3, the control section 120 comprises at least a digitizing device 130, a computing device 140, an input/output device, a storage device, and a peripheral device, but the input/output device, the storage device, and the peripheral device are not shown.

The digitizing device 130 comprises an image processing unit 132 where images taken by the camera 112 are processed. Specifically, a segmentation process is conducted to segment a dot image of a three-dimensional surface profile of the vehicle occupant photographed by the camera 112 into a large number of pixels. By the segmentation process, the information about vehicle occupant corresponding to each of the vehicle occupants is detected (extracted). The information about vehicle occupant may include the configuration (volume and body size) of the vehicle occupant, the position of the vehicle occupant, the posture of the vehicle occupant, the presence or not of the vehicle occupant, and the like. In this process, since the position of the vehicle occupant must be fixed to the driver seat, the front passenger seat, and the rear seat, regions corresponding to respective seats may be taken from the entire region projected by the sensor of the camera 112 and the detection process may be carried out only on the regions if necessary. According to the structure, the number of readout pixels as a factor of limiting the frame rate (the number of pixels and the speed are limited depending on AD conversion speed) can be reduced, thereby enabling high-speed process. Limitation of the number of pixels reduces the processing load on the image processing unit 132, effectively reducing the cost of the system.

The computing device 140 comprises at least a coordinate transformation unit 141, a plane setting unit 142, a volume calculating unit 143, and a body size determination unit 144.

The coordinate transformation unit 141 performs a coordinate transformation process of the images processed by the image processing unit 132. That is, based on information of detected distance from a single view point of the camera 112 to the object seated on the vehicle seat, the surface profile of the object is digitized into space coordinates (3D coordinates) by the coordinate transformation process. Therefore, the surface profile of the object is estimated. The coordinate system for the coordinate transformation process may be a polar coordinate system from the camera 112 or an orthogonal coordinate system of which Z-axis is an optical axis of the camera 112. Alternatively, the coordinate transformation process may be conducted to a coordinate system composed of coordinates in the anteroposterior direction, the vertical direction, and the lateral direction of the vehicle. After digitization into the space coordinates, the object on the seat is discriminated from the size, position, features of the surface profile of the object on the seat. As an example, it is determined whether the object on the seat on the vehicle seat is a vehicle occupant or a child seat. Specifically, since there are differences in general configuration of the object seated, surface profile upper a constant level from the seat surface, or spatial distribution of volume of the object on the seat between a case where the object seated is a vehicle occupant and a case where the object on the seat is a child seat facing rearward, it is discriminated whether the object on the seat on the vehicle seat is a vehicle occupant or a child seat.

Figure 4:
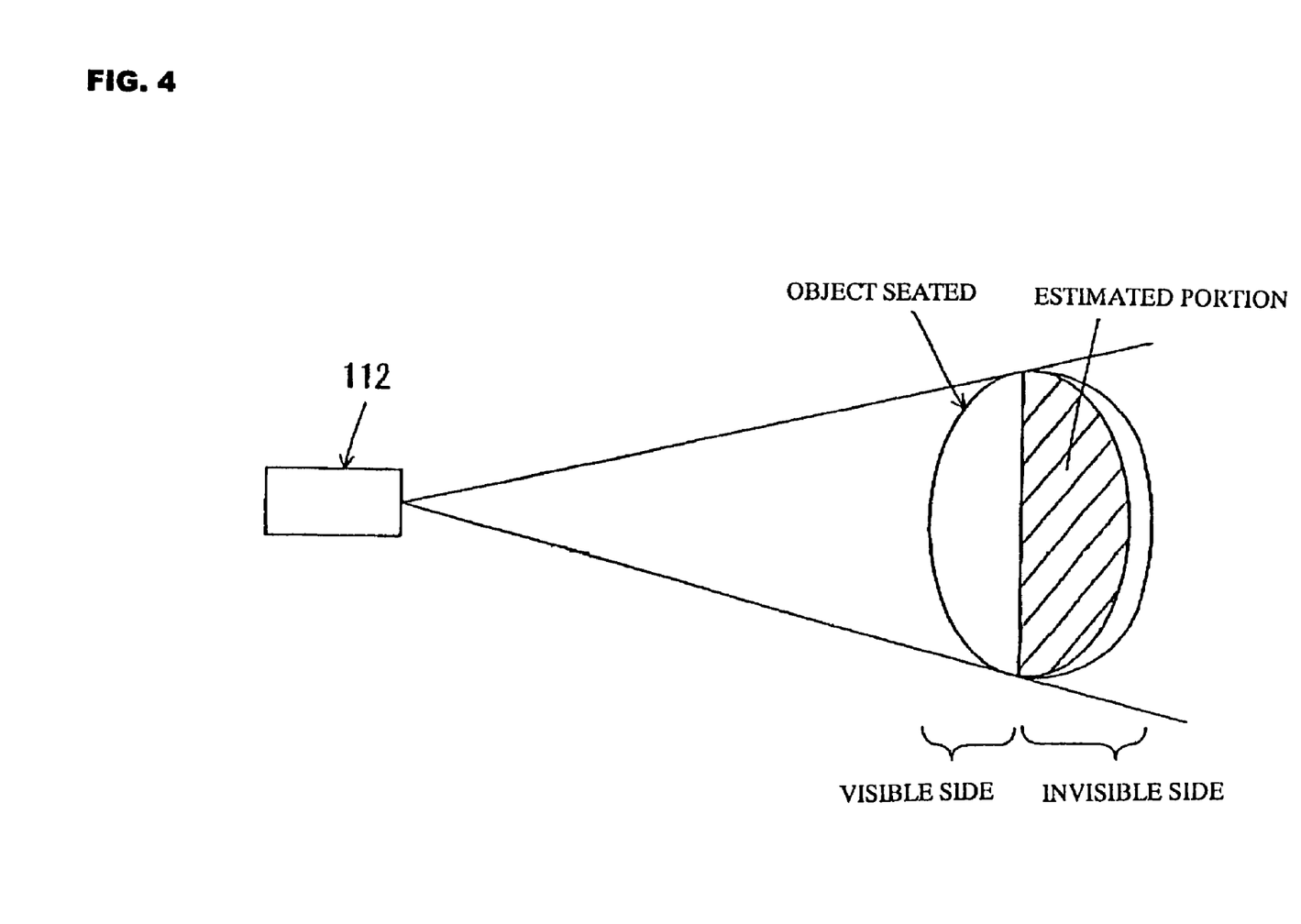
FIG. 4 is an illustration schematically showing the setting process of a reference plane by a plane setting unit 142.

The volume and body size of the object seated on the vehicle seat are discriminated by the plane setting unit 142, the volume calculating unit 143, and the body size determination unit 144. The plane setting unit 142 sets reference planes for defining the profile of the far side invisible from the single view point by the camera 112. The reference planes are defined by rotating the surface profile of the detected object 180 degrees. The setting process of the reference planes in the plane setting unit 142 is schematically shown in FIG. 4.

An alternative method is conducted taking into consideration that the seated object is less likely to project outside from the sides of the seat, backward from the seat back, or downward from the seat cushion. That is, the profile of the far side of the seated object is defined by three reference planes: a reference plane along the side of the seat, a reference plane along the seat back, and a reference plane along the seat cushion.

The volume calculating unit 143 derives the volume of the object on the seat from the surface profile and the profile of the far side of the object. The body size determination unit 144 determines the body size of the object on the seat from the volume derived by the volume calculating unit 143. For example, when the object on the seat is a vehicle occupant, the weight W of the vehicle occupant can be obtained by multiplying the volume by a density 1 [$g/cm^3$] because the density of human is substantially equal to the density of water. From the weight W, the body size and the posture of the vehicle occupant can be discriminated.

In this embodiment, the control section 120 preferably detects the position of a particular portion of the vehicle occupant as the object on the seat from the estimated three-dimensional configuration. It is preferable to derive information about the volume of the three-dimensional configuration, thereby detecting information about the size and posture of the vehicle occupant. As the term "particular portion" used here, a part which is effective in figuring out features of human body is set. Concretely, a portion of the face or the under jaw, or one of the shoulders may be set as the particular portion. By discriminating the particular portion, it is possible to detect the position of the feature part of the body such as the neck or the shoulder. According to this structure, it is possible to easily detect information about the size and posture of the vehicle occupant from the three-dimensional profile of the object on the seat.

The control section 120 having the aforementioned structure is connected to a control device (ECU) 160 which controls the overall vehicle. The information about the vehicle occupant extracted by the control section 120 is transmitted to the control device 160 and is then used to control a target device 170. The control device 160 detects, besides the information about occupant, information about collision prediction or collision occurrence of the vehicle, information about the driving state of the vehicle, information about traffic conditions around the vehicle, information about weather condition and about time zone, and the like and uses these detected information to control the target device 170. For example, based on the information about occupant, and information about collision prediction or collision occurrence of the vehicle, the control device 160 control the behavior (the pressure and the amount of gas to be supplied to an airbag) of an inflator as a gas supplying device for deploying and inflating the airbag (corresponding to the "occupant protection device" of the present invention) into a form suitable for the occupant. The control device 160 is adapted to control the actuation of the target device in the vehicle and the actuation of the occupant protection device for protecting the vehicle occupant based on the information about the object on the seat detected by the control section 120 and corresponds to the "actuation control device composing the actuation system" of the present invention. The target device 170 may be the airbag module to be actuated for protecting the vehicle occupant and other target devices to be controlled.

Further, the target device 170 may be an informing device (corresponding to the "informing device composing the informing system" of the present invention) used for letting the vehicle occupant(s) know the information about the object on the seat detected by the control section 120. By this informing device, the vehicle occupant is informed of the configuration (volume and body size) of the object on the seat, the position of the object on the seat, the posture of the object on the seat, the occupation status of the object on the seat, the kind of the object on the seat, and the like. The informing form of the informing device includes various output forms such as sound (announcement, buzzer, or the like), indication (color, character, mark, numeric, or the like), and vibration. According to this structure, by informing of the information about the object on the seat, the information about the object on the seat can be quickly transmitted to the vehicle occupant(s).

As a specific example, the control section 120 detects the size and posture of the vehicle occupant as the object on the seat and determines whether or not the vehicle occupant is in a proper state that the occupant will be properly protected by the occupant protection device such as an airbag in the event of vehicle collision based on the size and posture. When the detection device determines that the vehicle occupant is not in the proper state, the informing device is activated to inform the vehicle occupant of the result of the determination. According to the structure, by informing the vehicle occupant that the vehicle occupant is not in the proper state, the vehicle occupant is quickly prompted to correct his or her posture. The control section 120 also detects whether or not the vehicle occupant is seated as the information about the object on the seat. When the detection device detects that the vehicle occupant is seated, the informing device is activated to inform the vehicle occupant of the detected information. According to the structure, by informing the vehicle occupant of the information indicating that the vehicle occupant is seated, the vehicle occupant is quickly prompted to wear a seat belt for restraining the vehicle occupant.

Figure 5:
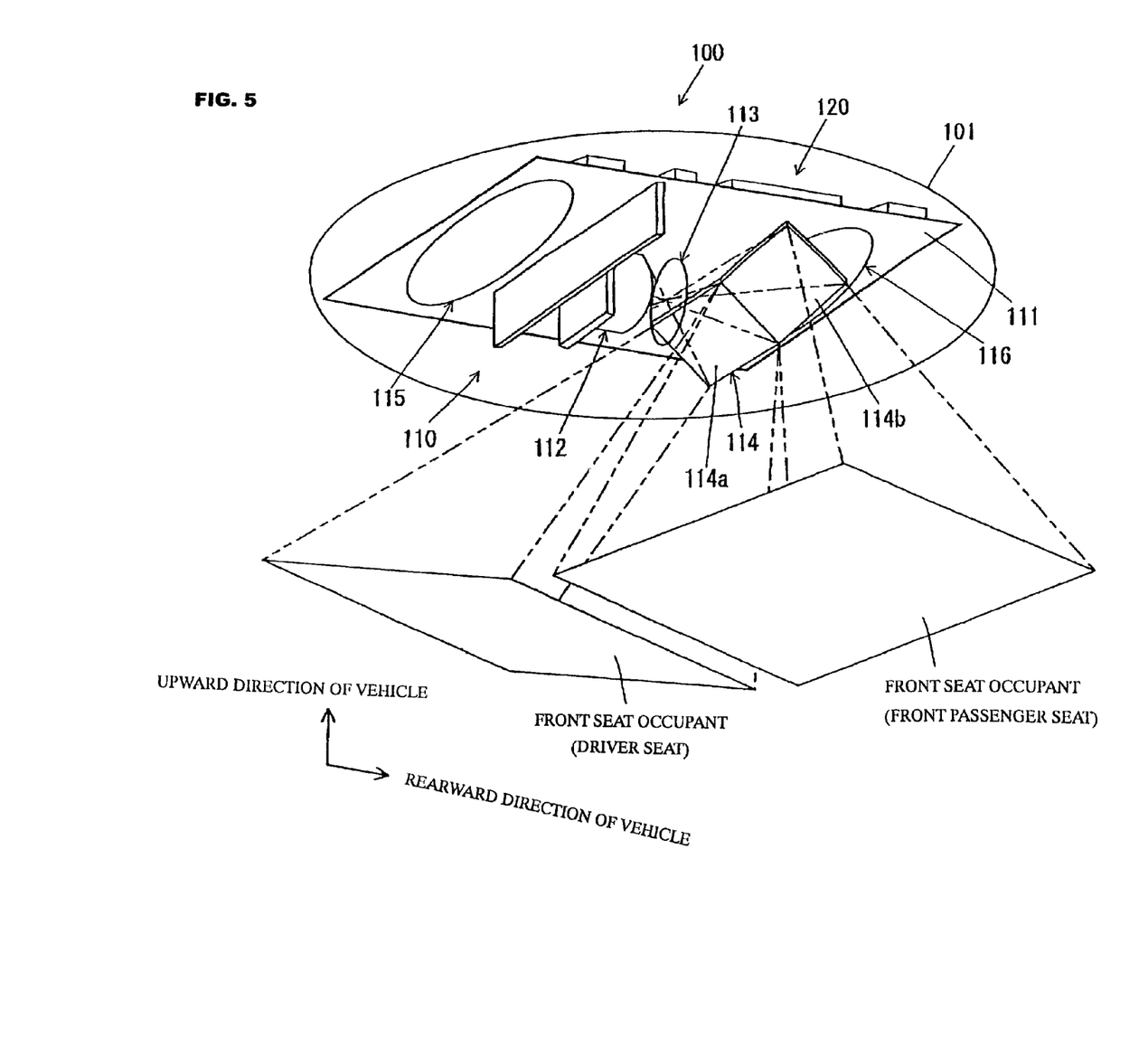
FIG. 5 is an illustration showing a state that front seat occupants C1 are photographed by the camera 112 of a photographing section 110.
Figure 6:
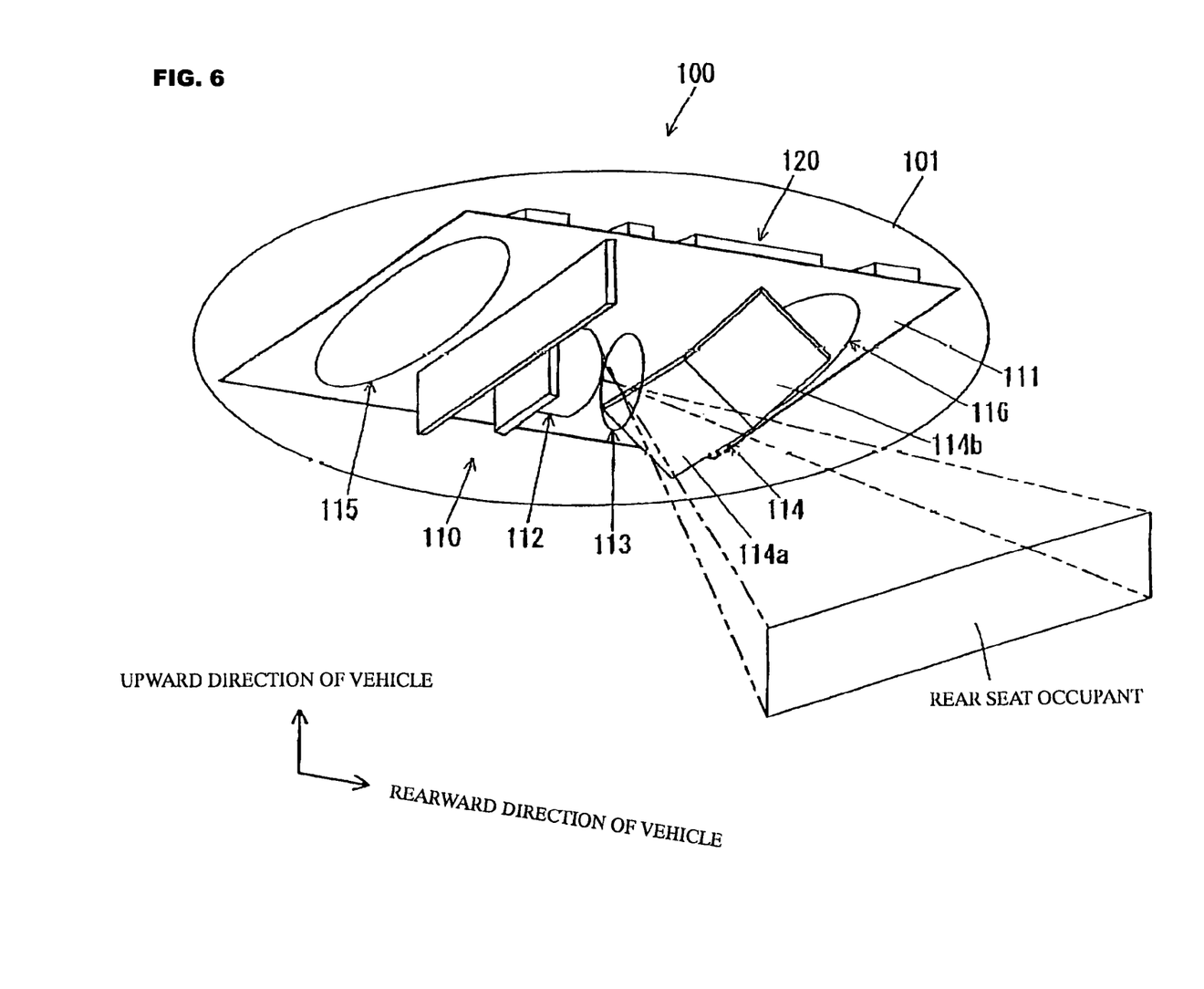
FIG. 6 is an illustration showing a state that rear seat occupants C2 are photographed by the camera 112 of the photographing section 110.

Hereinafter, concrete works of the photographing section 110 having the aforementioned structure will be described with reference to FIG. 5 through FIG. 7. FIG. 5 shows a state that the front seat occupants C1 are photographed by the camera 112 of the photographing section 110 and FIG. 6 shows a state that the rear seat occupants C2 are photographed by the camera 112 of the photographing section 110. In addition, FIG. 7 schematically shows the photographing state by the camera 112 of the photographing section 110 and the illuminating state by the front illuminator 115 and the rear illuminator 116.

As shown in FIG. 5 and FIG. 6, in the illuminating state by the front illuminator 115 and the rear illuminator 116, the field of view for the front seat occupants C1 and the field of view for the rear seat occupants C2 are projected to a single image sensor (the camera 112). The field of view for the front seat occupants C1 is projected to the image sensor via the mirror 114 and the projector lens 113 as shown in FIG. 5, while the field of view for the rear seat occupants C2 is projected to the image sensor via the projector lens 113 as shown in FIG. 6. As an example, FIG. 5 shows a case where the front seat occupants C1 are projected to an area about ¾ of the entire area of the image sensor (the camera 112) and FIG. 6 shows a case where the rear seat occupants C2 are projected to an area about ¼ of the entire area of the image sensor.

Relative to the viewing angle of the camera 112, the viewing angle for viewing both the driver seat and the front passenger seat of the front seats depends on the position of the camera 112 and the height of a roof so that there are a case of wider viewing angle and a case of narrow viewing angle. In case of wider viewing angle, the viewing angle should be divided into a plurality of sections. For example, the viewing angle for viewing both the driver seat and the front passenger seat of the front seats at the same time is in the range of from about 100 degrees to 120 degrees while the viewing angle of the camera 112 is about 80 degrees. In the embodiment shown in FIG. 5, the viewing angle is divided into two sections to view the driver seat and front passenger seat, respectively. As concretely explained, the mirror 114 is composed of two plane mirrors, i.e. a first reflecting facet 114a and a second reflecting facet 114b. The object seated on the driver seat is viewed by using the first reflecting facet 114a and the object seated on the front passenger seat is viewed by using the second reflecting facet 114b. This structure of the mirror 114 secures the viewing angle capable of viewing two fields corresponding to the driver seat and the front passenger seat as the front seats. As mentioned above, the mirror 114 of this embodiment is a mirror which has viewing angles corresponding to previously specified fields and is fixed to the vehicle.

Figure 7:
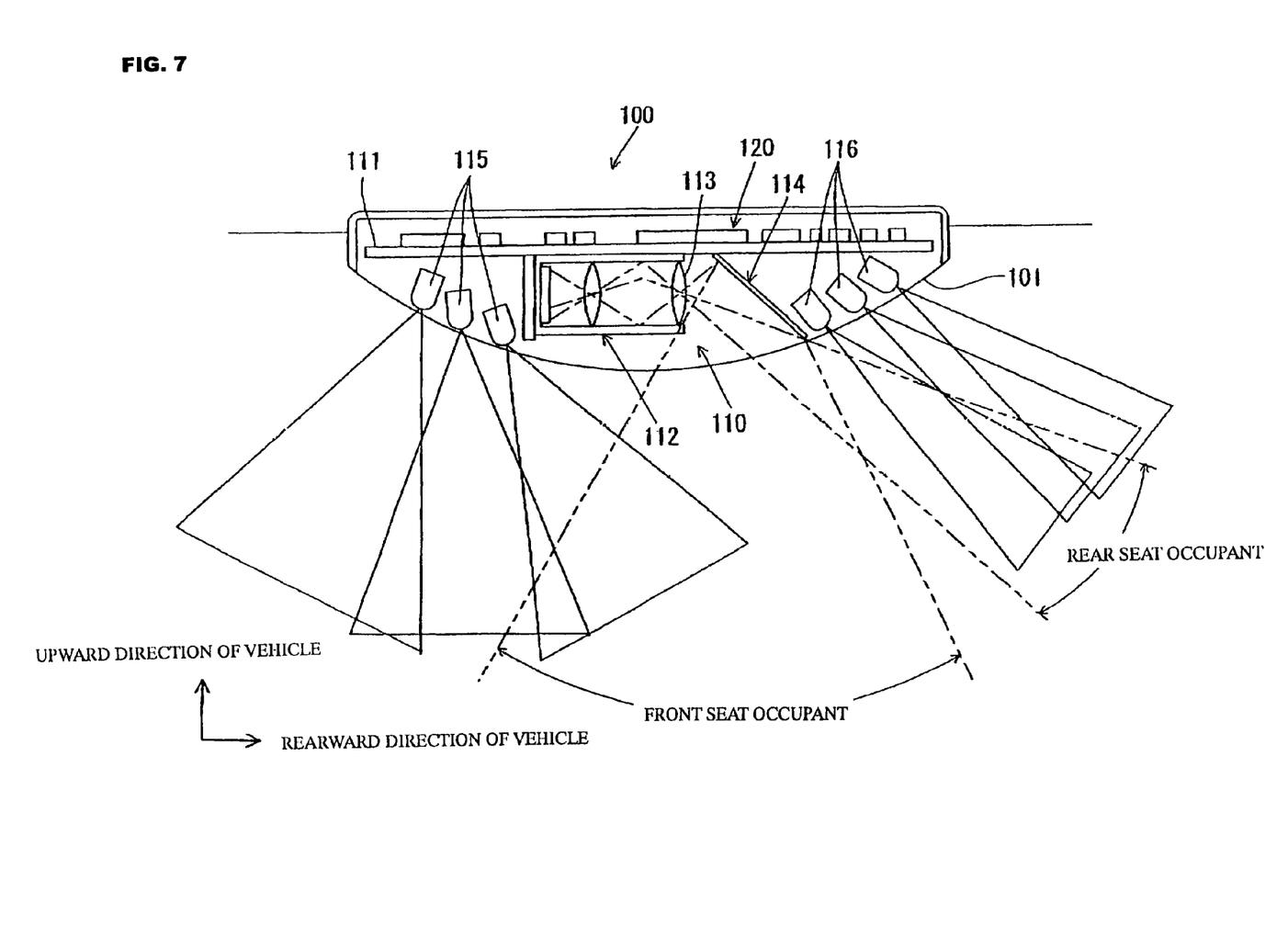
FIG. 7 is an illustration schematically showing the photographing state by the camera 112 of the photographing section 110 and the illuminating state by the front illuminator 115 and the rear illuminator 116.

In this embodiment, as shown in FIG. 7, the viewing angle 80 degrees of the camera 112 is divided to assign a viewing angle 60 degrees to the front seats and assign a viewing angle 20 degrees to the rear seat. By using a concave mirror or a convex mirror for the mirror 114 or using a lens on a cover of the mirror 114, the viewing angle can be adjusted to be wider or smaller.

In this embodiment, as shown in FIG. 7, the illumination device (lighting device) is also divided to correspond to the projected regions. In the embodiment as shown in FIG. 7, the front illuminator 115 is divided into a plurality of sections (three sections shown in the illustrative example shown in FIG. 7) corresponding to the projected region for the front seats in the anteroposterior direction of the vehicle, while the rear illuminator 116 is divided into three sections corresponding to the projected region for the rear seat in the anteroposterior direction of the vehicle. Since the rear seat is located at a longer distance apart from the illuminator as compared to the front seats, required illuminance can be obtained by narrowing the focus of the illumination device.

In this embodiment, it is preferable that the lighting interval and the illumination intensity of the illumination device are independently variable to correspond to the respective projected regions because the life of illumination can be extended by optimizing the illuminance according to the time required for detection and the detection frequency of the sensor, with the distance to the vehicle occupant, the focus, the angle of field (direction), and the like, taken into consideration, so as to minimize the deterioration due to emission and heat of the illumination device. Specifically, the illumination device preferably has a driving circuit for each object on the seat so that the illumination form can be independently set to correspond to the object on the seat. According to the structure, the illumination form by the illumination device is reasonably controlled.

In this embodiment, the structure for allowing variable illumination form may be a structure in which the illumination forms are previously set to correspond to the respective objects on seats or a structure in which the illumination form is varied every time the distance or the angle of field between the camera 112 and the object on the seat is detected. According to the structure, the illumination form of the illumination device can be properly set for each object seated, thereby improving the efficiency of illumination.

In this embodiment, the illumination device is preferably adapted to emit light of near-infrared wavelength. Such light is invisible to the eyes of vehicle occupants. Therefore, the illumination device hardly affects the field of view of the vehicle occupants.

Further, in this embodiment, the location of the illumination device may be anyplace where allow the field of view to view at least a part of the seated object (object to be detected), and the illumination device is preferably placed on a roof center line extending in the anteroposterior direction of the vehicle. Especially, when taking the field of view for viewing the rear seat into consideration, the illumination device is preferably located at the center of the roof center line in the anteroposterior direction. The location of the illustration device is a position allowing the information about the objects seated on the driver seat, the front passenger seat, and the rear seat to be detected.

In this embodiment, instead of the combination of the projector lens 113 and the mirror 114, a "prism" as an optical member having functions of deflecting, reflecting, and diffusing incident light may be employed. According to this structure, the prism works the functions of the projector lens 113 and the mirror 114, thereby effectively reducing the size of the apparatus.

In the occupant information detection apparatus 100 of this embodiment, the single camera 112 is used and the projector device (the mirror 114), which is capable of projecting the objects on the seat to the single camera 112 independently corresponding to the respective vehicle seats, is used, thereby easily detecting information about the objects seated on the vehicle seats. This structure of the occupant information detection apparatus 100 does not require warping correction that is required if using a wide-angle lens or a fish-eye lens, thereby solving the problem of complexity and large size of the apparatus using such a lens.

In this embodiment, since the mirror 114 provided with the first reflecting facet 114a and the second reflecting facet 114b as two plane mirrors is employed as the projector device, the structure of the projector device is simplified.

In this embodiment, the structure of digitizing the three-dimensional configuration of the object on the seat into space coordinates (3D coordinates) enables the high-precision estimation of the three-dimensional configuration of the object on the seat, thereby enabling the higher precision of detection of desired information about the object on the seat.

Further, in this embodiment, the occupant information detection apparatus 100 is located at a central portion in the lateral direction of the interior ceiling 12 where it can view all of the driver seat, the front passenger seat, and the rear seat, thereby enabling the detection of information about the objects on the seat in a wide range including the objects seated on the driver seat, the front passenger seat, and the rear seat.

Furthermore, in this embodiment, the region to be detected and processed by the control section 120 is limited from the projected region in the camera 112 so as to remove excess detection process for other region, thereby achieving the reduction in processing amount (calculating amount) relating to the detection and thus enabling high-speed process. Because of the reduction in processing amount (calculating amount), the processing load is reduced, thereby effectively reducing the cost on the system.

Moreover, in this embodiment, an actuation system, an informing system, and a vehicle are provided in which information about respective objects seated on a plurality of vehicle seats can be detected easily by the occupant information detection apparatus 100 and the detection results are used to control the actuation of respective target devices and an occupant protection device.

The present invention is not limited to the aforementioned embodiments and various applications and modifications may be made. For example, the following respective embodiments based on the aforementioned embodiment may be carried out.

Though the aforementioned embodiment has been described with regard to a case where the occupant information detection apparatus 100 is placed on the interior ceiling 12 of the vehicle, the location of the occupant information apparatus 100 can be properly varied if necessary. For example, in case of the occupant information detection apparatus employed for the front seats, the occupant information detection apparatus may be placed on the root of an A-pillar, a middle portion between the A-pillar and a B-pillar, on an interior side of a door mirror, at an upper portion of a rear view mirror, and at a center portion in the lateral direction of a dashboard. Either of the positions is a position where it can detect information of objects seated on the driver seat and the front passenger seat. Especially, the occupant information detection apparatus on the root of the A-pillar or on the interior side of the door mirror is effectively adopted to a vehicle with a layout which limits the occupant information detection apparatus to be placed at the center portion in the lateral direction of the interior ceiling. The occupant information detection apparatus on the root of the A-pillar or on the interior side of the door mirror has no interference in design with the side curtain airbag and has wide viewing angles relative to the front seat occupants.

Though the aforementioned embodiment has been described with regard to a case of detecting information about vehicle occupants on the vehicle seats, the present invention can employ such a structure for deriving information about various objects (for example, a child seat) put on the vehicle seat, other than the vehicle occupant, such as the configuration (volume and body size), the position, the posture, the occupation status, and the kind of the object.

Though the aforementioned embodiment has been described with regard to a case where the mirror having the field of view corresponding to the previously estimated specified field of view is the mirror 114 which is fixed to the vehicle body, the present invention can employ a mirror or a prism which has a field of view narrower than the previously estimated specified field of view and which is adapted to be movable relative to the vehicle body so as to ensure the specified field of view.

Though the aforementioned embodiment has been described with regard to the structure of the occupant protection device to be installed in an automobile, the present invention can be adopted to various vehicles other than automobile such as an airplane, a boat, and a train.

What is claimed is:

1. A detection system for detecting objects on vehicle seats in a vehicle, the detection system comprising:
    an image capturing device having a predetermined viewing angle and being mounted to the vehicle to direct the viewing angle in a predetermined direction so that the viewing angle provides a predetermined angular field of view;
    a projecting mechanism having a single predetermined viewing angle that is larger than the predetermined viewing angle of the image capturing device to provide a single predetermined angular field of view that is wider than the predetermined angular field of view of the image capturing device, the projection mechanism being mounted to the vehicle to be disposed within the narrower field of view of the image capturing device and to direct the projecting mechanism viewing angle in a single predetermined direction different than that of the direction in which the predetermined viewing angle of the image capturing device is directed and so that vehicle seat portions otherwise outside the image capturing device predetermined field of view are within the wider field of view of the projecting mechanism and images thereof are projected to the image capturing device by the projecting mechanism, the projecting mechanism being configured so that the images within the wider field of view thereof are projected to the image capturing device without requiring warping correction;
    a safety device of the vehicle for protecting a vehicle occupant in the event of emergency conditions; and
    a controller that receives and analyzes image information from the image capturing device for actuation of the safety device,
    wherein the image capturing device comprises a camera, and the projecting mechanism comprises a prism, and
    wherein the controller is configured to approximate a portion of a profile of an object or occupant on a seat in the predetermined viewing angle of the projecting mechanism and which is hidden from view.

2. The detection system of claim 1 wherein the predetermined angular field of view of the image capturing device is approximately 80 degrees, and the predetermined angular field of view of the prism is between approximately 100 degrees to approximately 120 degrees.

3. The detection system of claim 1 wherein the safety device comprises an occupant restraint device that is configured to restrain the vehicle occupant in a vehicle seat during emergency conditions.

4. The detection system of claim 1 wherein the safety device comprises an indicator device configured to provide information regarding state of the vehicle occupant or object on a vehicle seat relative to proper use of an occupant restraint device of the vehicle.

5. A vehicle occupant detection system for a vehicle, the vehicle occupant detection system comprising:
    front and rear seats of the vehicle;
    a camera mounted to the vehicle;
    a projector lens mounted to the vehicle to have a field of view directed toward an area of the vehicle in which one of the front and rear vehicle seats is disposed; and
    a plane mirror mounted to the vehicle adjacent the projector lens so that the projector lens is between the camera and the plane mirror with the plane mirror having a field of view directed toward another area of the vehicle in which the other of the front and rear vehicle seats is disposed so that images of the area of the one of the front and rear vehicle seats are projected to the camera by only the projector lens and images of the other area of the other of the front and rear vehicle seats are projected to the camera by both the plane mirror and the projector lens with the plane mirror and the projector lens configured so that the images of the areas of the front and rear vehicle seats are projected to the camera without requiring warping correction,
    wherein the front seats comprise a driver seat and a passenger seat that are in a wider field of view relative to the camera than that provided by the field of view of the camera, and the plane mirror comprises two plane mirrors with one of the plane mirrors reflecting images from the driver seat to the camera and the other plane mirror reflecting images from the passenger seat to the camera.

6. The vehicle occupant detection system of claim 5 wherein the projector lens field of view is directed toward the vehicle area in which the rear seats are disposed and the plane mirror and projector lens project images of the other area in which the vehicle front seats are disposed to the camera.

7. The vehicle occupant detection system of claim 5 wherein the camera field of view is formed by a predetermined viewing angle, and the plane mirror is configured and arranged so that a predetermined portion of the camera viewing angle is redirected toward the other area of the vehicle in which the other of the front and rear seats are disposed.

8. The vehicle occupant detection system of claim 7 wherein the camera is mounted to be closer to the front seats, the plane mirror redirects the predetermined portion of the camera viewing angle toward the front seats, and the camera viewing angle includes another predetermined portion directed toward the rear seats that is smaller than the predetermined viewing angle portion redirected toward the front seats.

9. The vehicle occupant detection system of claim 5 including a control section having a processing device that processes the images photographed by the camera to determine one of size and posture or both of an occupant on the seats, and a control device that receives information relating to the object from the control section for actuating a target device.

10. The vehicle occupant detection system of claim 9 wherein the target device comprises an occupant protection device.

* * * * *